3,478,041
SALTS OF NICOTINIC ACID
Alfons Soder, Frankfurt am Main-Schwanheim, and Gerhard Busing, Wiesbaden, Germany, assignors to Chemische Werke Albert, Wiesbaden-Biebrich, Germany, a corporation of Germany
No Drawing. Filed Apr. 19, 1967, Ser. No. 631,895
Claims priority, application Germany, Apr. 23, 1966, C 38,854
Int. Cl. C07d 31/36; A61k 27/00
U.S. Cl. 260—295.5                       7 Claims

ABSTRACT OF THE DISCLOSURE

Non-hygroscopic, water soluble and physiologically compatible salts of nicotinic acid and tris-(hydroxyalkyl)-aminoalkanes, especially of tris-(hydroxymethyl)-aminomethane, and their preparation from nicotinic acid, or a salt respectively a salt forming functional derivative thereof and the corresponding tris-(hydroxyalkyl)-aminoalkane of the formula (HO—alk—)$_3$C—A—NR$^1$R$^2$, in which R$^1$ and R$^2$ represent lower alkyl groups or hydrogen atoms, alk represents an alkylene group having 1 to 4 carbon atoms and A an alkylene group of the same definition or a direct single bond.

---

Nicotinic acid has found wide use not only as such but also in the form of various derivatives, e.g. as esters, in treating circulatory disorders and in numerous other indications. However, the solubility of nicotinic acid in water is relatively low, i.e. 1.19% by weight, based on the solution, at 10° C. to 1.47% at 20° C., and 1.82% at 30° C. The saturated aqueous solution has a pH value of 3.25, i.e. it is physiologically incompatible since it is too acidic.

Salts of nicotinic acid, such as the sodium, calcium and aluminum salt, contain cations which are sometimes therapeutically undesirable or, like the magnesium salt, are of disadvantage in making pharmaceutical preparations owing to their hygroscopic properties. Salts of nicotinic acid with readily compatible aminoalcohols such as 2-aminoethanol, diethanolamine and triethanolamine show highly hygroscopic properties to an even greater extent than does the magnesium salt.

This invention provides salts of nicotinic acid with tris-(hydroxyalkyl)-aminoalkanes of the formula

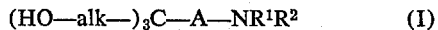

$$(HO—alk—)_3C—A—NR^1R^2 \qquad (I)$$

in which formula, R$^1$ and R$^2$, which may be the same or different, represent lower alkyl groups, particularly unbranched alkyl groups, generally having 1 to 4 carbon atoms, or preferably hydrogen atoms;

alk represents an alkylene group having 1 to 4 carbon atoms, particularly an unbranched alkylene group and preferably a methylene group; and A represents an alkylene group as defined above for alk or more preferably a direct single bond between the tertiary carbon atom and the amino group; various alkylene groups, namely alk and A, being the same or different.

While R$^1$, R$^2$, A and alk may each contain up to 4 carbon atoms, these substituents altogether preferably contain not more than 9 and more specifically not more than 6 carbon atoms.

It has been found that the nicotinic acid salts of the invention, and particularly the preferred salts, namely those having the radicals described hereinbefore as preferred for R$^1$, R$^2$, A and alk, are substantially non-hygroscopic and are readily soluble in water. Thus the nicotinic acid salt of tris-(hydroxymethyl)-aminomethane is soluble at 20° C. to 55% by weight, based on water, and forms solutions of exactly neutral reaction (pH of 7.0). Like tris-(hydroxymethyl)-aminomethane, this salt also possesses excellent physiological compatibility. It has the high buffering capacity common for organic acid salts of tris-(hydroxymethyl)-aminomethane and is of outstanding value for various therapeutic applications, owing to the inert behaviour of its tris-(hydroxymethyl)-aminomethane moiety towards enzyme systems.

According to a further feature of the invention, therefore, we provide a pharmaceutical composition comprising a salt according to the invention in association with an inert diluent, carrier, or excipient. Salts according to the invention, especially the nicotinic acid salt of tris-(hydroxymethyl)-aminomethane, whether used alone or in association with other physiologically active agents, are excellently useful for the manufacture of pharmaceutical compositions. Such compositions include for example coated pills, tablets, capsules, solutions, and suppositories, wherein the novel nicotinic acid salt is combined with inert diluents or carriers, for instance with tableting aids such as sugars, starch, or talc.

The nicotinic acid salts of the invention or compositions containing them may be administered orally, rectally or parenterally, e.g. in the treatment of deficiencies of B-vitamins, pellagra, glossitis, stomatitis, sprue, hypertension, migraine, trigeminal neuralgia, congelation, heavy metal poisoning, gestosis, and especially in hypercholesterolemia and in various circulatory diseases, e.g. angina pectoris and acrocyanosis. Said salts may also advantageously replace nicotinic acid or other derivatives of nicotinic acid in diets or in animal feeds, e.g. in enriched cereal products.

The novel salts can be prepared according to the invention by reacting an approximately equivalent amount of nicotinic acid or a derivative thereof, and a tris-(hydroxyalkyl)-aminoalkane of the Formula I hereinbefore defined in a solvent, and isolating the compound formed, e.g. by distillation of the solvent at ordinary or reduced pressure. Suitable derivatives of nicotinic acid are e.g. a salt or a salt-forming functional derivative of nicotinic acid, such as an acid halide e.g. the chloride, or nicotinic acid anhydride or an ester which readily undergoes cleavage. Suitable solvents are water or hydrophilic solvents, e.g. alcohols, such as the lower aliphatic alcohols methanol and ethanol, ketones, e.g. acetone, an acid amide such as dimethylformamide or a water miscible ether, e.g. tetrahydrofuran, dioxan or a mixture of such solvents. The use of water or aqueous solvents is preferred. If derivatives of nicotinic acid such as those cited above are used as starting materials, at least an equimolar amount of water must be present. The novel salts may also be prepared by double decomposition of a salt of nicotinic acid and a salt of the amino compound of the Formula I, e.g. an alkaline earth metal salt of nicotinic acid and the sulphate of the amino compound, forming an insoluble sulphate by-product.

Example 60.5 g. of tris-(hydroxymethyl)-aminomethane and 61.5 g. of nicotinic acid are dissolved in water. The water is then evaporated in vacuo and the residue is recrystallized from 500 ml. of ethanol. The yield is 112.5 g., corresponding to 92.5% of the theoretical amount; the melting point is 160–162° C. Solubility in water at 20° C.: 550 mg. per ml.; pH-value of a 10% aqueous solution: 7.0. A further amount of the salt may be obtained from the mother liquor of the reaction mixture.

The term "compositions" as used herein preferably refers to pharmaceutical compositions but in a broader sense is also including such compositions as diets or animal feeds in which the novel salts of the invention are applied in association with ailments or animal feedstuffs.

What we claim is:
1. A nicotinic acid salt of a tris-(hydroxyalkyl)aminoalkane of the formula

$$(HO\text{—}alk\text{—})_3C\text{—}A\text{—}NR^1R^2 \qquad (I)$$

in which each of $R^1$ and $R^2$ is a member selected from the group consisting of alkyl groups having 1 to 4 carbon atoms and hydrogen atoms;

alk represents an alkylene group having 1 to 4 carbon atoms;

a represents a member selected from the group consisting of alkylene groups having 1 to 4 carbon atoms and a direct single bond between the tertiary carbon atom and the amino group, $R^1$, $R^2$, A and alk altogether containing not more than 9 carbon atoms.

2. A salt as claimed in claim 1 wherein at least one of the radicals $R^1$ and $R^2$ represents a hydrogen atom.

3. A salt as claimed in claim 1 wherein alk, A, $R^1$ and $R^2$ represent unbranched groups.

4. A salt as claimed in claim 3 wherein alk represents a methylene group.

5. A salt as claimed in claim 1 wherein A represents a direct single bond between the tertiary carbon atom and the amino-group in the formula of claim 1.

6. A salt as claimed in claim 1 wherein $R^1$, $R^2$, A and alk altogether do not contain more than 6 carbon atoms.

7. As a salt as claimed in claim 1 the nicotinic acid salt of tris-(hydroxymethyl)-aminomethane.

References Cited

UNITED STATES PATENTS 3,341,594   12/1967   Thomas et al. _____ 260—295.5

HENRY R. JILES, Primary Examiner

ALAN L. ROTMAN, Assistant Examiner

U.S. Cl. X.R.

424—266

UNITED STATES PATENT OFFICE
CERTIFICATE OF CORRECTION

Patent No. 3,478,041                          November 11, 1969

Alfons Soder et al.

It is certified that error appears in the above identified patent and that said Letters Patent are hereby corrected as shown below:

Column 3, line 12, "a", first occurrence, should read -- A --.

Signed and sealed this 17th day of February 1970.

(SEAL)
Attest:

Edward M. Fletcher, Jr.                      WILLIAM E. SCHUYLER, JR.
Attesting Officer                              Commissioner of Patents